(12) United States Patent
Huber et al.

(10) Patent No.: US 6,519,282 B1
(45) Date of Patent: Feb. 11, 2003

(54) METHOD FOR DIGITAL TRANSMISSION OF INFORMATION

(75) Inventors: Johannes Huber, Langensendelbach (DE); Robert Fischer, Erlangen (DE); Wolfgang Gerstacker, Nuremberg (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/184,695

(22) Filed: Nov. 2, 1998

(30) Foreign Application Priority Data

Nov. 3, 1997 (DE) .......................................... 197 48 363
Aug. 7, 1998 (DE) .......................................... 198 35 760

(51) Int. Cl.$^7$ ................................................. H03H 7/30
(52) U.S. Cl. ..................... 375/232; 375/348; 375/349; 375/350
(58) Field of Search ................................. 375/229, 230, 375/232, 233, 348, 349, 350

(56) References Cited

U.S. PATENT DOCUMENTS

| | | | | |
|---|---|---|---|---|
| 5,572,262 A | * | 11/1996 | Ghosh ......................... | 348/607 |
| 5,909,466 A | * | 6/1999 | Labat et al. ................. | 375/233 |
| 6,026,121 A | * | 2/2000 | Sadjadpour .................. | 375/282 |
| 6,134,265 A | * | 10/2000 | Long .......................... | 375/222 |

FOREIGN PATENT DOCUMENTS

EP 0314360 5/1989

OTHER PUBLICATIONS da Rocha et al., "Self–Learning Deconvolution Using a Cascade of Magnitude and Phase Equalizers", 1996, Circuits and Systems, 1995, Proceedings of the 38th Midwest Symposium, vol. 1, 255–258.*

"Dynamics Limited Precoding, Shaping, and Blind Equalization for Fast Digital Transmission over Twisted Pair Lines" by R.F.H. Fischer et al, IEEE Journal on Selected Areas in Communications, vol. 13, No. 9, Dec. 1995, pp. 1622–1633.

Robert F. H. Fischer, Wolfgang H. Gerstacker and Johannes B. Huber, all IEEE Members, entitled "Dynamics Limited Precoding, Shaping, and Blind Equalization for Fast Digital Transmission over Twisted Pair Lines", IEEE Journal On Selected Areas In Communications, pp. 1622–1633, dated Dec. 1995 , vol. 13, No. 9.

M. Tomlinson, entitled "New Automatic Equaliser Employing Modulo Arithmetic", Electronics Letters, dated Mar. 25, 1971, pp. 138–139, vol. 7, Nos. 5/6.

Hiroshi Harashima and Hiroshi Miyakawa, IEEE Member, entitled "Matched–Transmission Technique for Channels With Intersymbol Interference", IEEE Transactions On Communications, dated Aug. 1972, pp. 774–780, vol. Com–20, No. 4.

Yoichi Sato, entitled "A Method Of Self–Recovering Equalization for Multilevel Amplitude–Moducation Systems" IEEE Transations On Communications, dated Jun. 1975, pp. 679–682.

Wolfgang H. Gerstacker, Robert F. H. Fischer, and Johannes B. Huber, entitled "A Transmission Scheme For Twisted Pair Lines With Coding, Precoding, and Blind Equalization".

* cited by examiner

*Primary Examiner*—Stephen Chin
*Assistant Examiner*—David B. Lugo

(57) ABSTRACT

A method is described for digital transmission of information over copper lines wherein digital signals are precoded by a fixed precoder on a transmitter side and are recovered by blind equalization on a receiver side. The blind equalization is subdivided into an equalization of the magnitude and a subsequent equalization of the phase.

2 Claims, 1 Drawing Sheet

METHOD FOR DIGITAL TRANSMISSION OF INFORMATION

BACKGROUND OF THE INVENTION

1. Technical Field

The invention relates to a method for digital transmission of data over copper lines, wherein digital signals are precoded with a fixed precoder on the transmitter side and wherein the signals are recovered on the receiver side through blind equalization (see "IEEE Journal on Selected Areas in Communication", Vol. SAC-13, December 1995, pp. 1622 to 1633).

This method can be used for transmission of information over copper lines as well as for wireless transmission. While subsequent discussion relates mainly to applications for transmission over copper lines, it is in no way intended to be the limit of the applicability of the invention.

2. Description of the Prior Art

Fast digital transmission methods over copper cable, that include several or a large number of so-called two-wire lines placed next to each other, have become increasingly important because of their potential to enable a variety of new digital services in the near future. They also provide a gradual transition to glass fiber networks and have to be able to operate reliably over long cable lengths, because the number of repeaters between the telephone exchange of a telephone network and the subscriber has to be kept small for economic reasons.

Attenuation and distortion during the land-line transmission of information signals produce channel-related intersymbol interference (ISI). The channel-related ISI in digital information transmission can be effectively eliminated through equalization with decision feedback equalization (DFE). This method is highly efficient and not very complex. However, DFE cannot be combined directly with coded modulation because the feedback filters in DFE require an immediate decision about the transmitted signals.

Tomlinson (see Electronics Letters, Vol. 7, March 1971, pp. 138 and 139) and Harashima/Miyakawa (see IEEE Transactions on Communications, Vol. COM-20, August 1972, pp. 774 to 780) propose a solution for this problem. They propose to shift the feedback filter of the DFE to the transmitter. In addition, they introduce a modulo operation to limit the amplitude. This method is referred to as Tomlinson-Harashima precoding (THP). However, a transmission with optimal THP requires information about the channel state on the transmitter side which has to be transmitted via a return channel. This requires complex protocols for setting up the connection to prevent mutual blocking of the two transmission directions. Also, not every application may have a return channel.

This problem can be sidestepped, as described in the above referenced article, by employing a fixed precoder which simplifies the set-up of the connection. However, preceding that is not optimized produces residual interference which has to be equalized linearly on the receiver side. The linear equalizer for the residual interference is adapted blindly, i.e. without using a training sequence. However, in a system using THP, it is essentially impossible to provide blind equalization at the symbol clock rate because the signal that has to be reconstructed has an approximately discrete Gaussian distribution. The precoding is therefore modified to limit the dynamic range of the effective transmitted signal and to produce signals with better statistics. An example for such a method is "Dynamics Shaping" (DS). The DS method permits blind equalization while maintaining or even increasing the excellent efficiency of THP. For uncoded transmission with the DS method, a simple standard method for blind equalization can be employed, using the so-called Sato algorithm (see IEEE Transactions on Communications, Vol. COM-23, June 1975, pp. 679 to 682).

SUMMARY OF THE INVENTION

It is the object of the invention to improve the method described above and also the blind equalization process.

The invention solves the object by subdividing the blind equalization into an equalization of the magnitude followed by an equalization of the phase.

This method for digital data transmission is easy to implement. Most importantly, the signal which is to be recovered in the equalizer may be correlated, whereas the methods known in the art can only recover white signals. The method is very efficient due to the fixed precoding and two-stage blind equalization. The preceding is adapted to a fixed reference application, so that channel information does not have to be retransmitted. Blind equalization removes the resulting residual interference. Equalization of the magnitude takes into consideration any correlation present in the transmitted sequence. The blind equalization can then be robust even if the signal-to-interference ratio at the equalizer input is very small. In particular, after the magnitude has been equalized, a simple blind algorithm can be used to equalize the phase. The convergence is very fast, in spite of strong residual interference at the input of the magnitude equalizer, and in spite of a low signal-to-noise ratio (SNR) and the presence of correlated symbols that have to be reconstructed.

The cable path that can be spanned can be significantly lengthened by further coding of the signals, for example by using trellis-coding. In this case, equalizing the magnitude before separately equalizing the phase has also proven to be particularly advantageous due to the small signal-to-noise ratio at the equalizer input.

The invention will be fully understood when reference is made to the following detailed description taken in conjunction with the accompanying drawing.

BRIEF DESCRIPTION OF THE DRAWING

The drawing includes schematic circuit diagrams, as follows.

DETAILED DESCRIPTION OF THE INVENTION

The following description is based on a digital transmission of signals and data, respectively, in the base band. Consequently, all signals and systems have real values. The method is also described for the case where the signals are first encoded, preferably trellis-coded. However, the invention does not require additional encoding.

Figure 1:
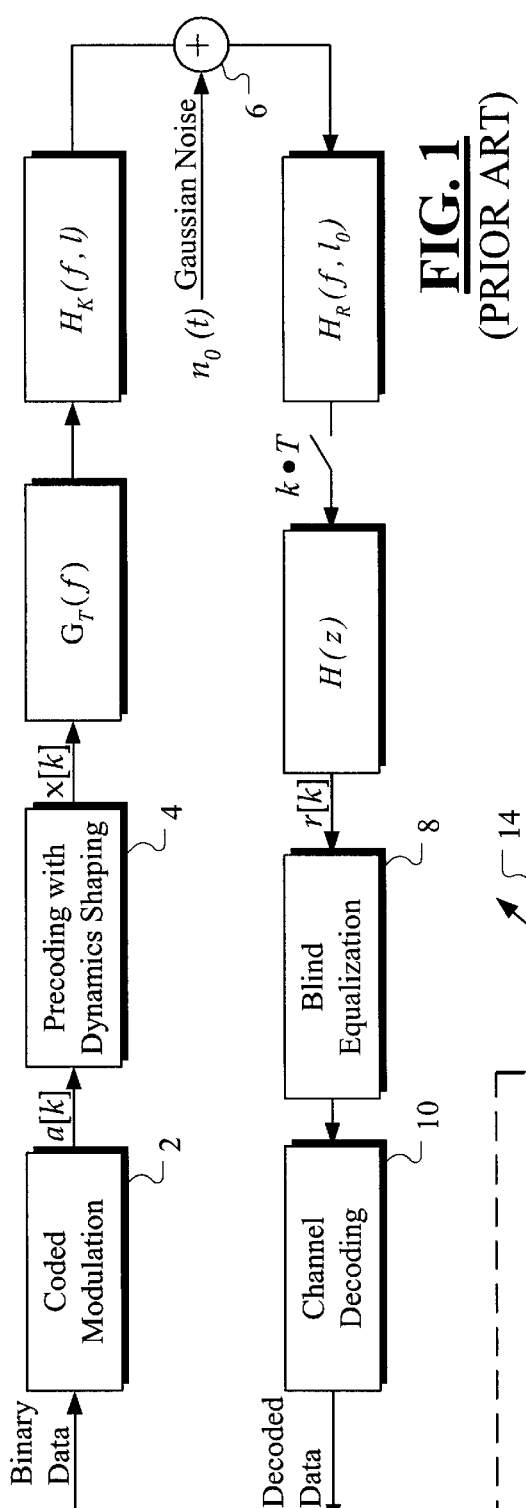
FIG. 1 is a block diagram of a copper line transmission path that is known in the art.

As seen in FIG. 1, the binary data is first encoded by a channel coder 2, which generates a series of Pulse Amplitude Modulation (PAN) symbols $a[k] \in \{\pm 1, \pm 3, \ldots, \pm(M-1)\}$, each symbol may assume M values. Precoding with dynamic limitation with a precoder 4 maps the series $a[k]$ to a series $x[k]$ of channel symbols. The series $x[k]$ is applied to a transmit filter $G_T(f)$ and transmitted via a two-wire line of a copper cable with a length l and a transfer function $H_K(f, l)$. A Gaussian interference $n_0(t)$ is assumed to be present in the transmission path and added at a junction point 6. For transmission via HDSL (High Rate Digital Subscriber Lines), such interference can be, for example, near-end crosstalk originating from a number of other HDSL systems which transmit over two-wire lines running in parallel in the same cable.

The input filter of the receiver is an optimized Nyquist filter (ONF) $H_R(f, l_0)$ which without THP would generate on the receiver side an ISI-free signal after sampling with the symbol clock rate, as long as the actual cable length matches the design length $l_0$ which was postulated when the precoder and the input filter were designed. The case $l=l_0$ produces residual interferences. All parameters of the actual conditions and the reference application, except the cable length l, are assumed to be identical. This is not a significant limitation because differences in other parameters can be adequately expressed as equivalent differences in length.

The linear equalization provided by the ONF produces strong colored noise with a very high variance in the sampled signal. The noise can be reduced by connecting a subsequent FIR filter $H(z)$ that converts the noise into approximately white noise (noise whitening filter). The coefficients of this monic (i.e. linear) minimum-phase filter can be calculated with the help of the Yule-Walker equations by requiring that the noise variance at the filter output is minimum. (The term "monic" being defined as, for a polynomial, having the coefficient of the term of highest degree equal to 1, or in other words "linear".) The transmitter coupling in a cable transmission can be taken into account by requiring a zero of $H(z)$ at DC ($z=1$) (DC Direct Current).

The filter $H(z)$, the output signal of which is referred to as $r[k]$, generates again ISI which has to be removed by the fixed precoder. With THP, the series $x[k]$ of channel symbols is generated sequentially symbol-by-symbol according to the following equation:

$$x[k] = a[k] + 2M * d[k] - \sum_{\kappa=1}^{q_h} h[\kappa] * x[k - \kappa].$$

The symbols $d[k] \in Z$ here correspond to the modulo-operation in THP. The sequence $h[\kappa]$ indicates the impulse response of the noise whitening filter of degree $q_h$.

For the following process, an effective data sequence (EDS) $v[k]$ is defined via the following equation:

$$v[k] = a[k] + 2M * d[k].$$

The series $x[k]$ is produced by filtering $v[k]$ with the formal inverse of $H(z)$. Consequently, the EDS arises again after the filter $H(z)$ if no is present and $l=l_0$. The series $a[k]$ of PAM symbols can then be unambiguously recovered by applying once again a modulo-operation.

Precoding can also be modified to produce signals with more advantageous statistics. For example, the DS method can be used, which enables a blind equalization; additionally the already high efficiency of THP can be further increased. With the DS method, the series $d[k]$ is not selected symbol-by-symbol, but by measuring symbols over a longer period of time, with the requirement that the transmitted power is minimum. The boundary condition $|v[k]| \leq V_{max}$ has to be observed. The variable $V_{max}$ is the externally prescribed maximum amplitude of EDS.

As can be seen from the power density spectrum (PDS) of the EDS, the temporally adjacent values are strongly correlated with THP as well as with the DS method. This correlation, as well as the large number of possible levels of the EDS values—even when using the DS method—and a low SNR at the equalizer input, put severe demands on the blind equalization on the receiver side. The residual interference is removed by a linear equalizer which reconstructs the EDS $v[k]$ and is adapted without a training sequence, i.e. blindly. The equalizer 8 cannot directly reconstruct the series $a[k]$ due to the nonlinear modulo-operation in the precoder. A channel decoder 10 decodes the channel and provides decoded data as shown.

Figure 2:
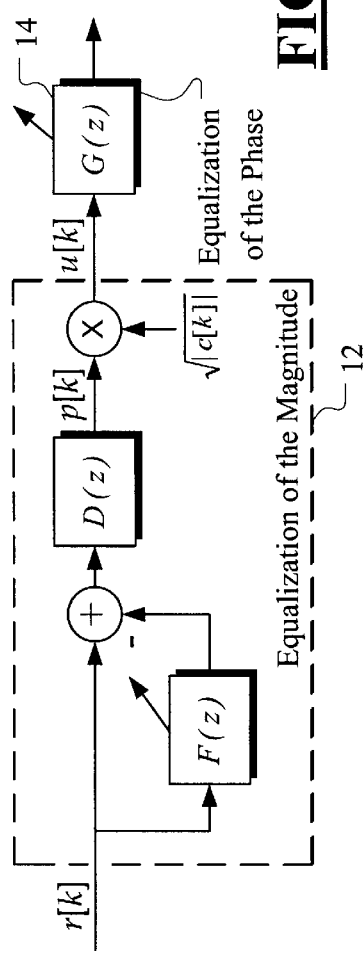
FIG. 2 is a block diagram of one embodiment of the invention of the present invention, shown and described as an addition to that shown in FIG. 1.

According to the present invention, the blind equalization in FIG. 1 is subdivided into an equalization of the magnitude 12 followed by an equalization of the phase 14 as shown in FIG. 2. This improves the performance of the blind equalization over a single stage structure. The transfer function $F(z)$ represents a prediction filter, the function $D(z)$ is a coloring filter and the function $G(z)$ represents a phase equalizing filter.

When the magnitude is equalized in a conventional manner by using conventional techniques, an approximately white signal with minimal variance is forced at the output of the magnitude equalizer. A white output signal of the magnitude equalizer can remove distortions of the magnitude only if the transmission sequence has also a constant PDS. If this is not the case, then the magnitude equalization has to be modified so as to produce a variable PDS of the signal to be reconstructed. This can be accomplished with the two methods described below. The first method produces a white signal as an intermediate signal which is subsequently filtered in a suitable manner. The second method directly assigns the desired PDS and the autocorrelation sequence (ACS), respectively. Both methods are designed for correlated transmission signals.

Embodiment of the Magnitude Equalization

An approximately white signal is produced with a prediction error filter $1-F(z)$ configured as an FIR filter of degree $q_f$. The white signal is then colored with a fixed FIR filter $D(z)$ to produce a good approximation of the PDS of the EDS at the output of the FIR filter. The predictor coefficients $f[k]$ can be adjusted using either a Least Mean Square (LMS) algorithm or a Recursive Least Squares (RLS) algorithm. Most importantly, the power of the output signal of the prediction error filter has to be minimized. If a fast convergence of the first stage is desired, then the RLS algorithm should be selected.

The coloring narrow-band filter $D(z)$ is calculated by solving the Yule-Walker equations to produce a fictitious prediction-error filter $1-W(z)$ for the EDS with a relatively high degree $q_w$. In the absence of noise or ISI, and if $q_w=q_f$, the calculated coefficients are identical to those in the filter $1-F(z)$ after adaptation is complete.

The fictitious filter $1-W(z)$ would generate from the EDS an approximately white sequence. The inverse system $1/(1-W(z))$ can be used as a coloring filter $D(z)$. Because the fictitious filter $1-W(z)$ is a minimum-phase and monic filter, which is generally the case for prediction error filters calculated with the Yule-Walker equations, this inverse system can also be approximated by a causal, minimum-phase and monic FIR system. The Yule-Walker equations are subsequently used a second time to calculate the coloring filter D(z) which produces a signal with the highest possible whiteness from a signal with an ACS which is the same as the filter ACS of 1−W(z). The coloring filter D(z) depends only on the fixed pre-selected precoder and can therefore be calculated and set to fixed coefficient values.

The method described above guarantees a minimum-phase filter D(z). Since the prediction error filter 1−F(z) is also minimum-phase after convergence, the total transfer function of the magnitude equalizer is also minimum-phase. This aspect is advantageous for the subsequent phase equalization. In the present application, the phase response of the transfer function that is to be equalized, and consequently also the phase response of the inverse system, is closer to the phase response of a minimum-phase system than of a maximum-phase system. The residual phase distortions that remain after the magnitude has been equalized are then not too severe. The magnitude can be completely equalized by applying a correction with a factor SQUAREROOT(|c[k]|) subsequent to the filter D(z), wherein the factor is adjusted adaptively to make the powers of u[k] and v[k] identical. The signal u[k] is here the output signal of the automatic gain control (AGC).

Embodiment of the Magnitude Equalization

The magnitude is equalized with a single filter. The coefficients of the filter are adaptively adjusted to produce the desired ACS of the EDS directly at the output of the filter, except for an acceptable factor which can be removed by the AGC. An algorithm for this purpose is described in the following. The structure is assumed to be identical to that of FIG. 2, except that the coloring filter D(z) is omitted.

The (time dependent) coefficient vector for F(z) is represented as:

$$f[k]=[f_1[k]f_2[k] \ldots f_q[k]]^T,$$

which is recursively updated according to $$f[k+1]=f[k]-\mu_f(|p[k]|^2 \ast \phi - p[k] \ast s[k]),$$

wherein unlike in the previous formula, the number of the coefficient appears as an index.

The signal p[k] is the output signal of 1−F(z), s[k] is a vector with the most recent $q_f$ output values, where $s[k]=[p[k-1] p[k-2] \ldots p[k-q_f]]^T$, and φ is a vector with the desired (normalized) ACS values of the filter output signal, $$\varphi = \left[ \begin{array}{cccc} \frac{\varphi vv[1]}{\varphi vv[0]} & \frac{\varphi vv[2]}{\varphi vv[0]} & \ldots & \frac{\varphi vv[q_f]}{\varphi vv[0]} \end{array} \right]^T$$

The equation f[k+1] which applies to a base-band transmission can be easily modified for a modulated transmission, i.e. for complex signals. After convergence, the first $q_f+1$ ACS values of p[k] and v[k] are identical, except for a factor. The ACS sequences are then almost perfectly matched, unless $q_f$ is too small. The remaining factor can be corrected, as described above, by using AGC.

The magnitude is reliably equalized after the method has converged. Despite the fact that the method employs a gradient descent, it converges relatively fast when equalizing residual interference. Unlike the situation described in the previous section, the prediction error filter 1−F(z) here has to remove only the correlation produced by the channel, but not the correlation inherent in the EDS.

After the magnitude is equalized, the phase is equalized to remove the ISI which remains in the signal after the first stage and which is mainly caused by phase distortions. The method used here is truly blind and adapts another FIR filter G(z). The second adaptation process is started only after the first stage has converged. In this way, the second process is not adversely affected by the first process. Advantageously, the Sato algorithm is applied, more particularly a variation of the Sato algorithm modified according to Benveniste, which during the adaptation process produces a gradual transition to the DDLMS algorithm, thereby reducing the power of the error signal in the steady state.

Simulations have confirmed that, if the magnitude is equalized first, then the phase equalization in the second equalization stage converges even with a very small SNR produced due to a long cable. The correlation in the EDS has no adverse effect due to the drastically reduced ISI after the first stage. The adaptation process continues after convergence to track slow channel variations. On the other hand, the coefficients used in the prediction filter F(z) to equalize the magnitude can be held constant after the start of the phase equalization process.

Figure 3:
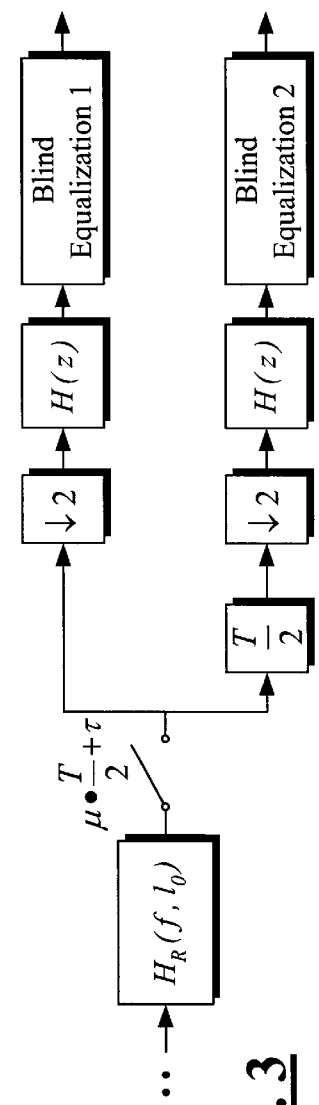
FIG. 3 is a block diagram of an additional embodiment that is the subject matter of the present invention.

The receiver structure can be modified to make the method less susceptible against erroneous sampling instants. This can be achieved by using the receiver structure of FIG. 3.

After the signal is sampled at the output of the ONF $H_R(f, l_0)$ at intervals T/2 with the sampling phase τ, the received values are supplied alternatingly to two separate branches of a filter bank for further processing. This produces two T-spaced sub-channels with sampling phases which are offset relative to each other by T/2. After equalization of each of the two T-spaced subchannels with the respective optimized linear equalizer, at least one of them has a location to produce an almost maximum attainable SNR for an arbitrary phase during the T/2 sampling. It is recommended to carry out a separate blind equalization in each of the two channels. By this, the convergence problems described in the published prior art referencing the blind T/2-spaced equalization can be eliminated. The method of separately equalizing the magnitude and the phase is again applied to the sub-channels. After convergence, the output signal of the better branch of the filter bank is selected for the subsequent decoding. This can be accomplished, for example, by comparing the temporally averaged squared error signals of the two blind equalizer algorithms in the sub-channels.

The preferred embodiment described above admirably achieves the objects of the invention. However, it will be appreciated that departures can be made by those skilled in the art without departing from the spirit and scope of the invention which is limited only by the following claims.

What is claimed is:

1. A method for digital data transmission of information, having the steps of preceding digital signals on a transmitter side with a fixed precoder and recovering precoded digital signals on a receiver side by blind equalization, characterized in that the method comprises the step of subdividing the blind equalization into an equalization of the amplitude and a subsequent equalization of the phase, the equalization of the magnitude being performed with a prediction error filter configured as a finite impulse response (FIR) filter having a transfer function 1−F(z) to produce an approximately white signal, and the equalization of the phase being performed with a phase equalizing filter configured as a finite impulse response (FIR) filter, where the function F(z) represents a prediction filter; and the equalization of the magnitude is performed with a series connection of said prediction error filter and a coloring filter, said coloring filter being configured as an FIR filter and having a transfer function $1/(1-W(z))$ and having fixed coefficient values, where the function $1/(1-W(z))$ is the inverse of an ideal prediction error filter.

2. A device for receipt of digital data transmission of information, wherein digital signals are precoded on a transmitter side with a fixed precoder and precoded digital signals are recovered on a receiver side by blind equalization, characterized in that said device comprises a series connection of a prediction error filter and a phase equalizing filter for subdivided blind equalization, said prediction error filter being configured as an FIR filter and having a transfer function $1-F(z)$ to produce an approximately white signal, and said phase equalizing filter being configured as an FIR filter, where the function $F(z)$ represents a prediction filter; and said device also comprises a coloring filter interconnected between the prediction error filter and the phase equalizing filter, said coloring filter being configured as an FIR filter and having a transfer function $1/(1-W(z))$ and having fixed coefficients, where the function $1/(1-W(z))$ is the inverse of an ideal prediction error filter.

* * * * *

UNITED STATES PATENT AND TRADEMARK OFFICE
CERTIFICATE OF CORRECTION

PATENT NO. : 6,519,282 B1
DATED : February 11, 2003
INVENTOR(S) : Huber et al.

It is certified that error appears in the above-identified patent and that said Letters Patent is hereby corrected as shown below:

Title page,
Item [75], Inventors, "Wolfgang Gerstacker", "Nuremberg" should be -- Nurnberg --.
Item [56], References Cited, U.S. PATENT DOCUMENTS, "Sadjadpour", "375/282" should be -- 375/262 --.

Column 6,
Line 51, "preceding" should be -- precoding --.

Signed and Sealed this

Seventeenth Day of August, 2004

JON W. DUDAS
*Acting Director of the United States Patent and Trademark Office*